May 17, 1960    M. H. FRANK    2,936,745
ENGINE COOLING SYSTEM
Filed Dec. 31, 1958
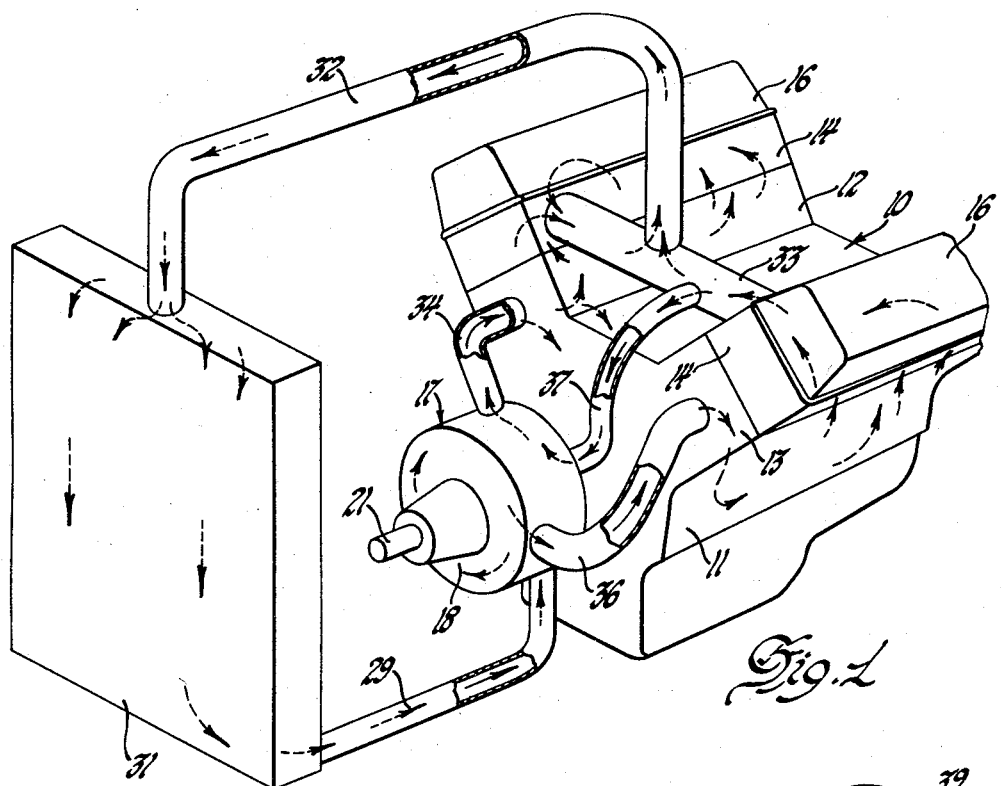
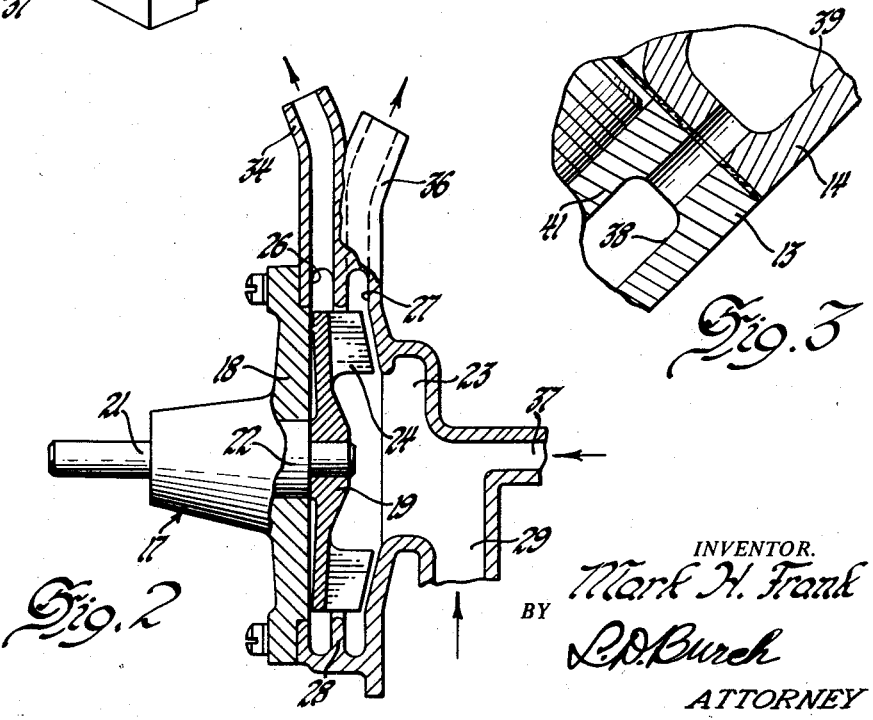
INVENTOR.
Mark H. Frank
BY L.P. Burch
ATTORNEY

United States Patent Office 2,936,745
Patented May 17, 1960

2,936,745

ENGINE COOLING SYSTEM

Mark H. Frank, Birmingham, Mich., assignor to General Motors Corporation, Detroit, Mich., a corporation of Delaware Application December 31, 1958, Serial No. 784,216

1 Claim. (Cl. 123—41.29)

This invention relates to cooling systems for engines and has particular relation to cooling system for internal combustion engines having a plurality of banks of cylinders, such for example, as V-type internal combustion engines for automotive and other purposes.

It is proposed to provide means circulating cooling fluid between an engine and a radiator and including a pump having annular discharge chambers surrounding the impeller employed in the pump, there being one of such discharge chambers for each bank of cylinders of the engine. Each discharge chamber is connected to one bank of cylinders. The single pump inlet is connected to the radiator of the engine.

In the drawing:

Figure 1 is a fragmentary view of a cooling system embodying the invention. The cooling system illustrated is embodied in a V-type, 8-cylinder internal combustion engine for automotive or other purposes.

Figure 2 is a fragmentary cross-sectional view taken through the axis of the pump embodied in the system illustrated by Figure 1, and in the radial plane of the two discharge chamber outlets for the pump.

Figure 3 is a fragmentary cross-sectional view through one of the cylinder banks and its head and showing the communicating cooling cavities in the head and the bank.

The engine 10 embodying the invention has a block 11 in which rows or banks of cylinders 12 and 13 are formed. Heads 14 are provided for the banks of cylinders 12 and 13, there being covers 16 for the valve actuating mechanisms for each of the heads 14. The cylinder banks 12 and 13, and the heads 14 have cooling fluid cavities 38 and 39, respectively, surrounding the cylinders 41 therein, and through which cooling fluid is circulated from the cylinder banks 12 and 13 to the heads 14 in the manner indicated by the arrows. Cooling fluid circulating means embodying a pump 17 is provided for the engine 10. The pump 17 embraces a pump casing 18 in which an impeller 19 is rotatably mounted on a shaft 21 supported by a bearing 22. The casing 18 is formed to provide an inlet chamber 23 disposed axially of the impeller 19 and adapted to supply cooling fluid to the vanes 24 of the impeller 19. Rotation of the impeller 19 causes the vanes 24 to discharge the cooling fluid so supplied to peripherally disposed discharge chambers 26 and 27 formed in the casing 18 radially outwardly from the vanes 24. The discharge chambers 26 and 27 are annular in formation and are disposed in parallel relation on opposite sides of a dividing wall 28 forming a part of the casing 18. An inlet conduit 29 connects the inlet chamber 23 to the lower part of a radiator 31. The upper part of the radiator is connected by a conduit 32 and a branch conduit 33 to the cooling cavities in the cylinder heads 14. The discharge chamber 27 is connected by a conduit 36 to cooling cavities in cylinder bank 13. A by-pass passage 37 is also connected between the inlet chamber 23 and the branch conduit 33 for returning a portion of cooling fluid to the inlet chamber at all times for the purpose of maintaining coolant circulation within the engine when the engine thermostat closes the outlet conduit 32. The impeller 19 may be driven from the engine in any suitable manner. It will be noted that the divided discharge chambers 26 and 27 provide separate 360° outlets from the impeller 19 and in effect provide a different pump for each of the cylinder banks. However, the same inlet chamber and impeller are employed.

I claim:

A cooling system for an internal combustion engine having banks of cylinders and a radiator and having means for circulating cooling fluid within and between said radiator and said engine and over said cylinders for cooling said cylinders and comprising, a cooling fluid circulating pump having an impeller with blades having a uniform diameter throughout the axial length of the impeller and a pump casing, said impeller being rotatively mounted in said casing, an inlet chamber formed in said casing at the axis of said impeller, a pair of discharge chambers formed in said casing around the periphery of said impeller, said discharge chambers being annular in formation and disposed in parallel planes normal to the axis of rotation of said impeller and being separated by a wall normal to the axis of rotation of said impeller and equally dividing the cooling fluid discharged by said impeller, and conduit means connecting each of said discharge chambers to one of said banks of cylinders and said inlet chamber to said radiator.

References Cited in the file of this patent

UNITED STATES PATENTS 2,713,332     Beardsley _____ July 19, 1955

FOREIGN PATENTS 610,726     Germany _____ Mar. 15, 1935